(12) United States Patent
Mohammadioun et al.

(10) Patent No.: US 7,881,661 B2
(45) Date of Patent: Feb. 1, 2011

(54) APPARATUS AND METHOD FOR PROVIDING NOTIFICATION ON REMOTE DEVICES

(75) Inventors: Said Mohammadioun, Atlanta, GA (US); John Kish, Roswell, GA (US); Ed Bryan, Lawrenceville, GA (US); David Wittler, Alpharetta, GA (US); Kevin Peterson, Canton, GA (US)

(73) Assignee: Intellisync Corporation, White Plains, NY (US)

( * ) Notice: Subject to any disclaimer, the term of this patent is extended or adjusted under 35 U.S.C. 154(b) by 1008 days.

(21) Appl. No.: 10/871,873

(22) Filed: Jun. 18, 2004

(65) Prior Publication Data

US 2005/0050148 A1    Mar. 3, 2005

Related U.S. Application Data

(60) Provisional application No. 60/479,152, filed on Jun. 18, 2003.

(51) Int. Cl.
*H04B 7/185* (2006.01)
*B60Q 1/00* (2006.01)

(52) U.S. Cl. .................. 455/12.1; 340/425.5; 701/201; 701/213; 709/206

(58) Field of Classification Search ................ 709/206; 714/748, 749; 340/425.5; 455/12.1; 701/2, 701/29, 201, 213; 370/425.5; 705/1
See application file for complete search history.

(56) References Cited

U.S. PATENT DOCUMENTS

| | | | |
|---|---|---|---|
| 6,625,439 B2 | 9/2003 | Laybourn et al. | |
| 6,847,892 B2 * | 1/2005 | Zhou et al. .................. | 701/213 |
| 2002/0198946 A1 * | 12/2002 | Wang et al. .................. | 709/206 |
| 2003/0149526 A1 * | 8/2003 | Zhou et al. .................. | 701/213 |
| 2005/0050148 A1 * | 3/2005 | Mohammadioun et al. .. | 709/206 |
| 2005/0250440 A1 * | 11/2005 | Zhou et al. .................. | 455/12.1 |
| 2007/0171029 A1 * | 7/2007 | Inbarajan .................. | 340/425.5 |

(Continued)

FOREIGN PATENT DOCUMENTS

JP    2001-266013 A    9/2001
JP    2003-87408 A    3/2003

OTHER PUBLICATIONS

International Search Report (PCT/ISA/210) issued in connection with PCT/US04/19578 mailed Nov. 30, 2004.
Notice of Reasons for Rejection for JP Application No. 2006-517423 dated Jan. 5, 2010.

*Primary Examiner*—William D Cumming
(74) *Attorney, Agent, or Firm*—Alston & Bird LLP

(57) ABSTRACT

A system and method for providing notification on remote devices are provided. In architecture, the system includes a computer device for performing the operation. The computer device includes a message send module that sends a message to the remote device using an IP link and a determination module that determines that the message sent by the IP link was not received by the remote device. Moreover, the computer device further includes a resend module that resends the message automatically using a SMS transmission process. A method for providing notification on remote devices is also provided. The method operates by (1) sending a message to the remote device using a IP link; (2) determining that the message sent by the IP link was not received by the remote device; and (3) resending the message automatically using a SMS transmission process.

13 Claims, 12 Drawing Sheets

U.S. PATENT DOCUMENTS

| | | | |
|---|---|---|---|
| 2007/0173986 A1* | 7/2007 | Inbarajan | 701/2 |
| 2007/0173992 A1* | 7/2007 | McCutchen et al. | 701/29 |
| 2007/0179706 A1* | 8/2007 | McCutchen et al. | 701/201 |
| 2007/0179798 A1* | 8/2007 | Inbarajan | 705/1 |
| 2007/0179799 A1* | 8/2007 | Laghrari | 705/1 |
| 2007/0179800 A1* | 8/2007 | Oesterling | 705/1 |

* cited by examiner

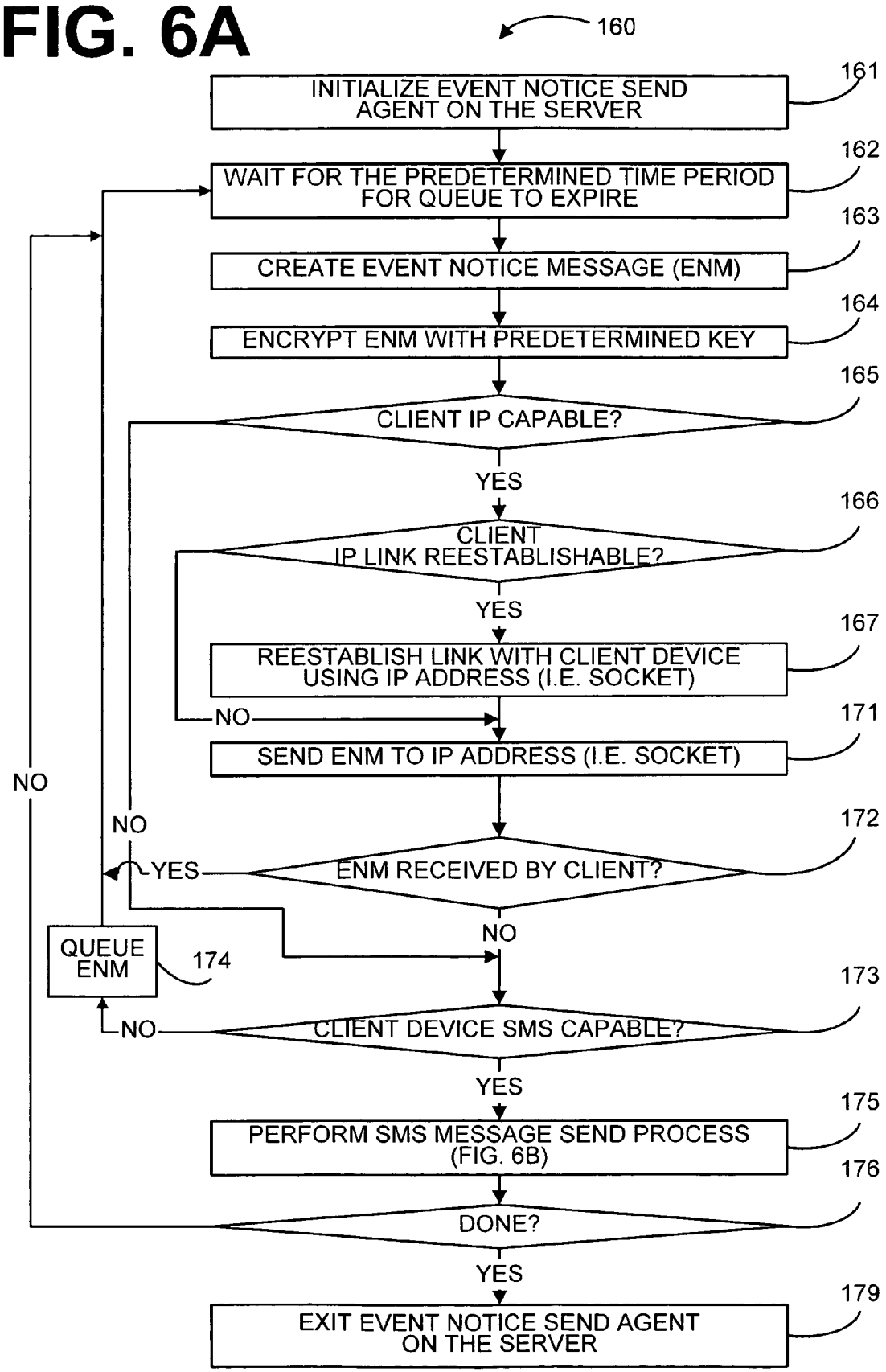

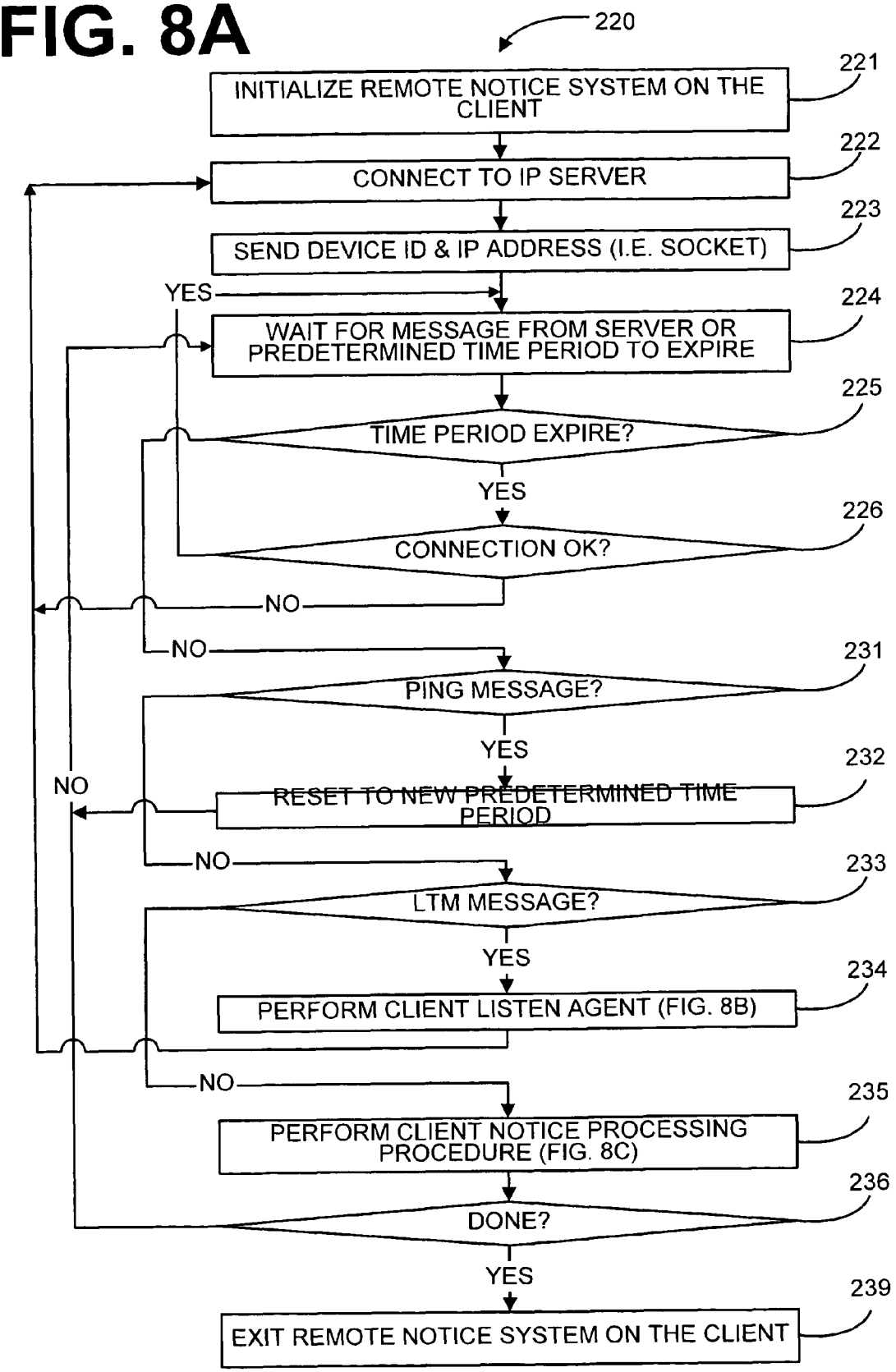

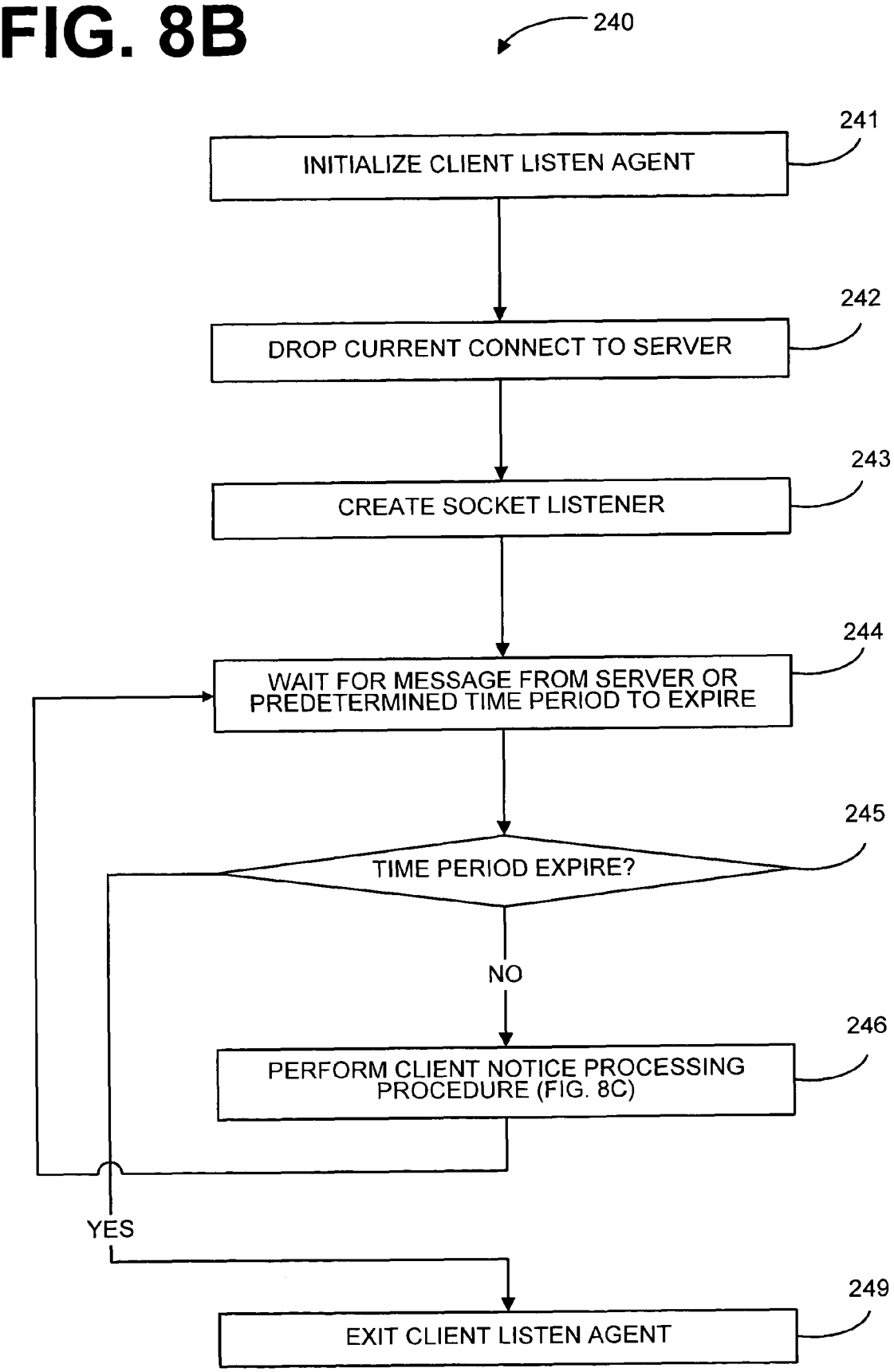

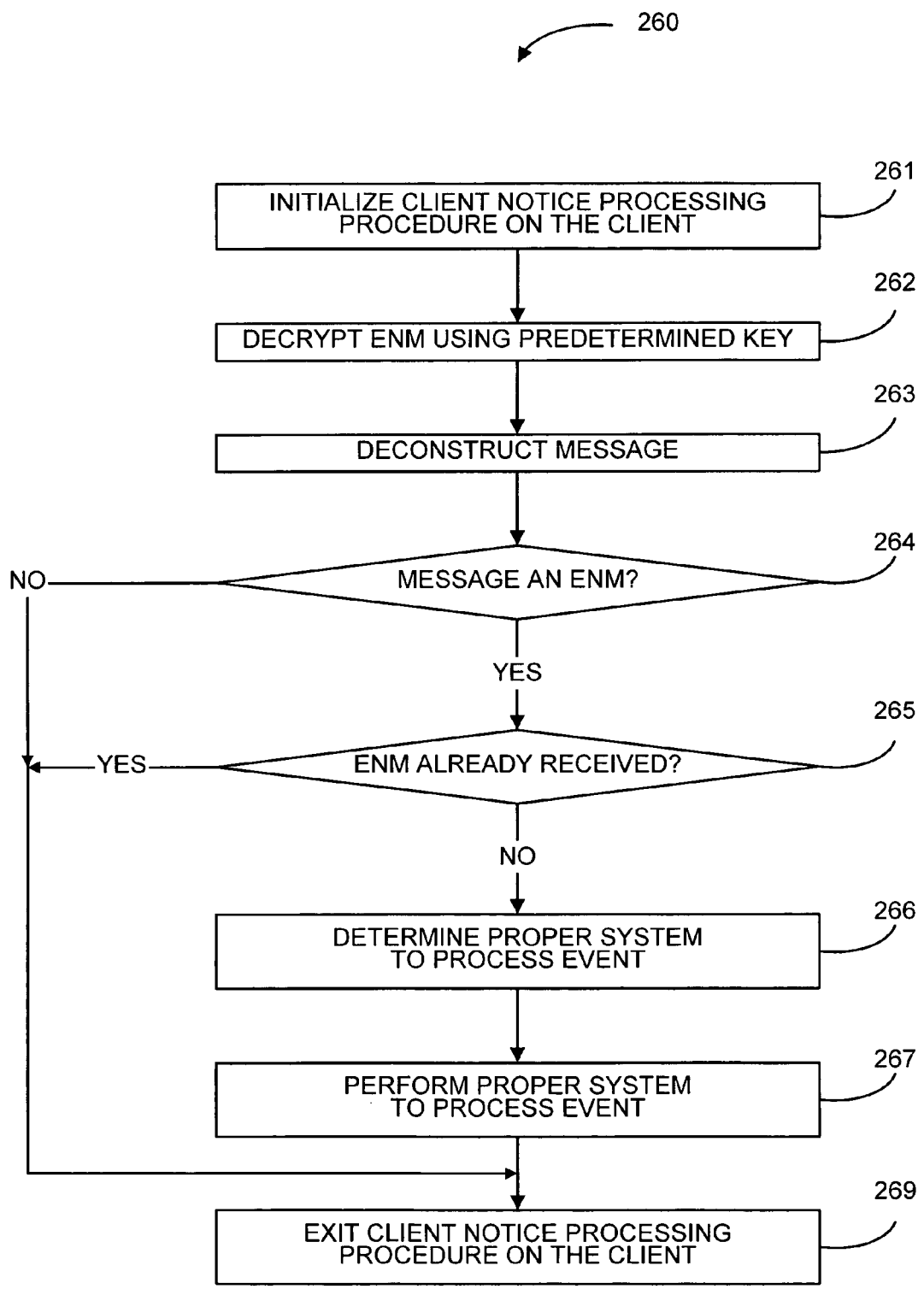

US 7,881,661 B2

APPARATUS AND METHOD FOR PROVIDING NOTIFICATION ON REMOTE DEVICES

CROSS-REFERENCE TO RELATED APPLICATIONS

This application claims the benefit of U.S. patent application Ser. No. 60/479,152, filed on Jun. 18, 2003, entitled "SYSTEM AND METHOD FOR PROVIDING NOTIFICATION ON REMOTE DEVICES", which is incorporated by reference herein in its entirety.

FIELD OF THE INVENTION

The present invention relates to a method and system for notifying users of events, and more particularly, relates to a method and system for providing notification on remote devices.

BACKGROUND OF THE INVENTION

In many business environments, a server is used to store data that is pertinent to many employees or remote users of a business. The server is typically accessible by remote computer devices ("clients") to increase the availability of information to the remote users. By providing files on a server, which may be accessed by remote computer devices, dissemination of information through the company is increased. Remote access to data is more critical in environments where a sales force or many employees operate away from the office. As an example, the remote employees rely on the information to be up-to-date to be informed about inventory changes, pricing data, and company events.

Rather than remain connected to the server indefinitely and collect telecommunication charges or tie up phone lines, the remote users only intermittently connect their computers to a server for access to data on the server. In these environments, the remote computer devices typically store the server data locally to support the remote application even when the client is not connected to the server. The intermittent connection is then used to send only changes made by the client application to the server and a pertinent set of changes from the server to the client. This type of remote computer system environment is called an Intermittently Connected (IC) environment.

An important communication issue for this type of computer environment is the timely and efficient exchange of information, including related information, between the clients and the server. The term "data transfer" is often used to describe the process of maintaining data consistency and integrity among server files and client files. There are many data transfer schemes for maintaining consistency. In some known file transfer schemes, various protocols and methods, for example compression to efficiently transfer files, are used.

Currently, data transfer for remote devices must be initiated either manually by a user on a remote device or on a predetermined schedule. When initiating data transfers manually the user must manually initiate communication without knowing if there is data to be downloaded. This manual initiation is costly both in time committed by the user to initiate the connection and for the connection time when there is no data to be downloaded to the remote device. An additional factor is when the client initiates a data transfer when the user is not able to make the connection to the data source. This is costly both in time and in power consumption.

Problems with scheduling data transfers on a predetermined schedule are that there are times when there is no data to be transferred and the connection is made for ultimately no reason. This is costly both in connection time and in power consumption. Additional problems with predetermined schedule data transfers is that for cost reasons it is more cost-efficient to have greater intervals between schedule connections. The problem with this is that the data is then not downloaded in the most timely fashion. A problem with scheduling data transfers with small enter roles is that it will waste more connection time (i.e. bandwidth) and power consumption.

Thus, heretofore an unaddressed need exists in the industry to address the aforementioned deficiencies downloading data to a remote device quickly and efficiently.

SUMMARY OF THE INVENTION

The present invention provides a system and method for providing notification on a remote device.

The invention may be conceptualized as a notification system on a computer device. The computer device comprises a message send module that sends a message to the remote device using an IP transmission means and a determination module that determines that the message sent by the IP transmission means was not received by the remote device. Moreover, the computer device further comprises a resend module that resends the message automatically using a SMS transmission means.

The present invention can also be viewed as a method for providing notification on remote devices. The method operates by (1) sending a message to the remote device using a IP transmission means; (2) determining that the message sent by the IP transmission means was not received by the remote device; and (3) resending the message automatically using a SMS transmission means.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIG. 6A is a flow chart illustrating an example of the operation of the event notice send agent utilized by the notification system of the present invention, as shown in FIGS. 2A-3.

FIG. 8A is a flow chart illustrating an example of the remote notice system on the remote device that is utilized in the notification system of the present invention, as shown in FIGS. 1-7.

FIG. 8B is a flow chart illustrating an example of the operation of the client listen agent utilized by the remote notice system on the remote device that is utilized in the notification system of the present invention, as shown in FIGS. 2B and 8A.

FIG. 8C is a flow chart illustrating an example of the operation of the client notice processing procedure utilized by the remote notice system on the remote device that is utilized in the notification system of the present invention, as shown in FIGS. 2B, 8A and 8B.

DETAILED DESCRIPTION OF THE INVENTION

Figure 1:
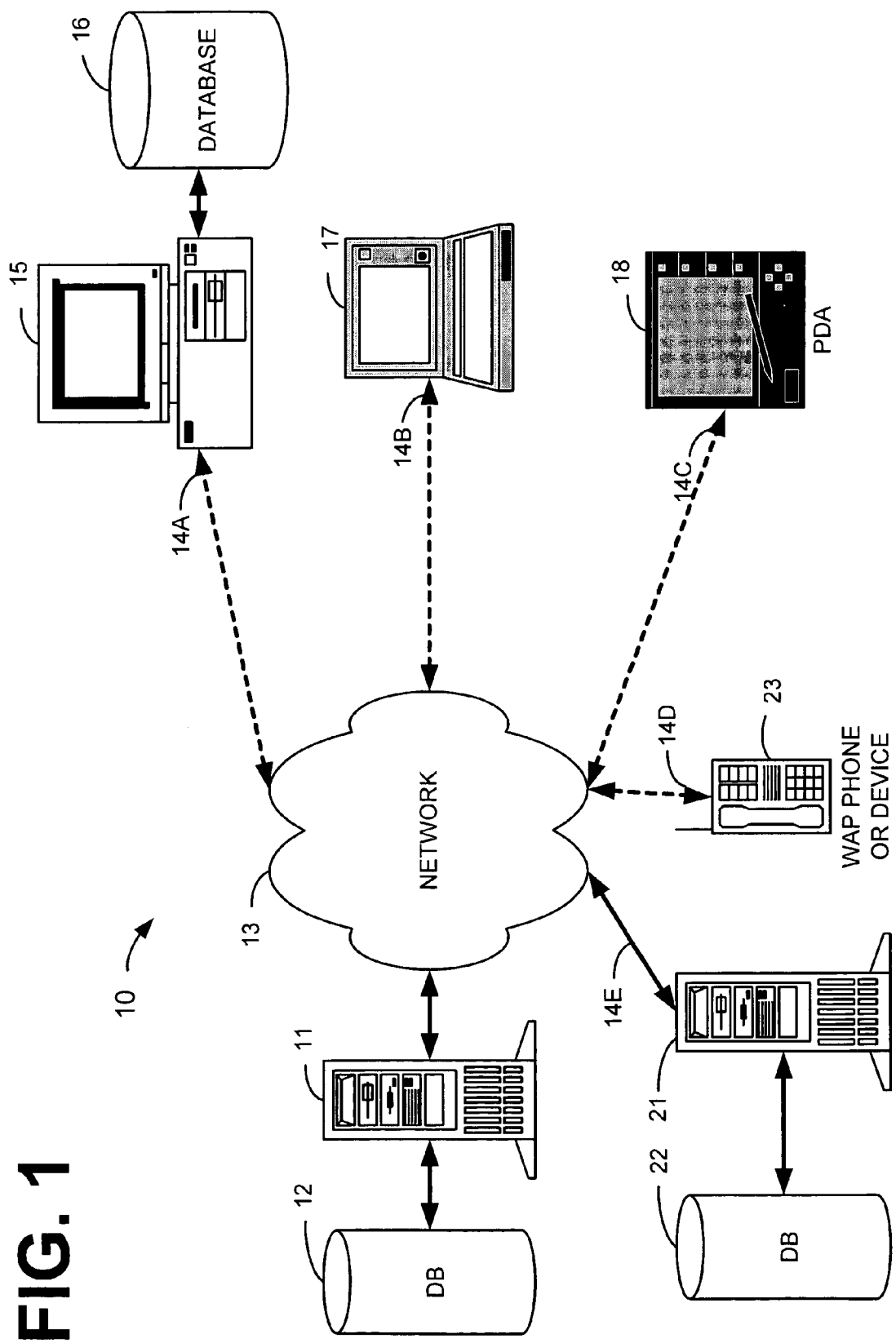
FIG. 1 is a block diagram illustrating an example of an environment of computer systems and the remote devices utilizing the notification system of the present invention.

The invention to be described hereafter is applicable to all remote devices using a notification system in the present invention providing notice to users of predetermined events. While described below with respect to a single computer, the system and method for a remote device notification system is typically implemented in a networked computing arrangement in which a number of computing devices communicate over a local area network (LAN), over a wide area network (WAN), or over a combination of both LAN and WAN.

The notification system of the present invention provides the following benefits: (1) Provides notification of events that work properly with data carrier (i.e. data transporter) firewalls; (2) Allows client initiated connections that will work from is anywhere, including Internet cafes where there is no addressing problem; and (3) Provide a notification system that will be self configuring for Internet protocol notification types; (4) Can be optimized for environments requiring internment connections or connections that are established only when a server has data to be transmitted.

The notification system of the present invention will work with carrier firewalls, that only allow connections initiated by the client and with those that provide for server initiated connections. The client initiated connections are necessary for some carriers in order to protect their users from unwanted and costly traffic. Client initiated connections also protected the carriers bandwidth, as the carrier can terminate the connection after a predetermined amount of non usage. Since the clients are initiating the connection, the client can connect with any type of remote device, including but not limited to: mobile devices, laptops, PCs, any type of computing devices and the like. Moreover, the notification system of the present invention is self configuring, since the client is initiating the contact to the internet protocol (IP) server and therefore presents its IP address for that connection. In those instances where the user connects via some other type of connection, short message service (SMS) messaging technology will be utilized to provide a backup for event notification.

Mobile professionals will carry multiple mobile computing devices, all of which have specific usage and connection characteristics, making each device uniquely appropriate for certain mobile usage situations. Given this diversity of devices, an obvious user problem is the notification of event information, including but not limited to e-mail so, calendar updates and alike on these remote devices. The notification system of the present invention provides universal notification of the events across all types of remote devices. The notification system of the present invention includes a server notification system and a client notification system. Descriptions of an example server notification system and client notification system are as follows.

The notice system on the server comprises three main sub-components: the event notice registration agent, the event notice collection agent, and the event notice send agent. When the notice system initializes, each of these sub-components is initialized. Each of these sub-components processes events relevant to their own responsibility until the notice system on the server is shut down.

The event notice registration agent collects registration events from clients and maintains a list of clients that are available to receive IP notifications. The event notice registration agent, after initialization, listens on a configurable port for connections from clients. After it receives a client connection, it waits for a transmission from the client containing the client device ID. If no errors occur on the link and the device ID matches a known device in the system, then the event notice registration agent marks the device as connected and available to receive any IP notifications. Then, the event notice registration agent checks to see if there are any outstanding notifications pending for this device ID. If so, it constructs and sends the pending notifications. If not, the event notice registration agent sends a message indicating no messages pending. The event notice registration agent also checks to see if it has the capability to re-establish connection to the client device. If the event notice registration agent determines that he can re-establish a connection to the client device then you will mark the connection to the client device as re-establish will record the address of the client device and then instructed the client device as to the maximum time before the next communication. The event notice registration agent will then terminate the current connection with the client device if it is possible to re-establish the connection later. If the event notice registration agent determines that it cannot re-establish a connection with client device then the connection to the client device is maintained for future data transmissions.

The event notice collection agent collects notification events from various sources, passes them through filters, aggregates and queues them for transmission. The event notice collection agent waits for event from a variety of sources. If the device associated with the event is configured to receive notifications, the event is passed through each of several possible filters that serve to limit the events that actually produce notifications. Once an event passes the filters, the event notice collection agent will aggregate queue the events. If a queue does not exist for the client device that is the target of the notification event, the event notice collection agent will create one. An event notification is then constructed and added to the queue and the queue timeout will be initialized to the predetermined setting. When this timeout expires, it will be time to send any notifications that have accumulated in the queue. This timeout period can be a preset time. From the last data transmission or can be manipulated with a technique known as throttling. The throttling time period is determined from a certain time period after the last data transmission to the client device and any additional time periods defined by a system administrator in order to minimize bandwidth utilization.

The event notice send agent is responsible for detecting notification queues that are ready for transmission, creating notification messages from these events that will be transmitted, picking the best method of transmission, and performing the message transmission.

The event notice send agent monitors event notification queues looking for those whose timeouts have expired. Once a queue is found that has timed out and is thus ready for transmission, the event notice send agent will construct an event notice message for the client device. This message is encrypted with a device specific key that has previously been determined. Once the message is constructed, the event notice send agent will determine which method to use in order to transmit the message. If the event notice registration agent has registered the device as IP capable, the message will be sent over the IP link. Otherwise, the message will be sent via SMS over SMTP if the device is SMS capable.

If a device has been registered via the event notice registration agent, the event notice send agent will attempt to send the event notice message over the IP link. If the transmission occurs without error, the transmission for the current notice message is complete. If errors do occur or the link is no longer available, the event notice message will be sent via SMS if the device is SMS capable. If the device is not SMS capable, the event notice message will be queued and will be later delivered by the event notice registration agent when the device re-registers.

The event notice send agent starts an SMS transmission by initializing the retry count for the current notice message, time stamping the notice message with the current time, and setting the sequence number for the message to the next increment. The message is then sent to the carrier for the device where it is converted into an SMS transmission to the device. If the device is not in coverage, the transmission is complete and retries will not be attempted. If the device is in coverage, the event notice send agent waits for a configurable predetermined time period. After this time period expires, the event notice send agent checks to see if the client device has connected to the server at a time after the time stamp in the notice message. If so, the transmission is assumed to have been acknowledged and the transmission is complete. If not, the event notice send agent checks to see if the number of retries has exceeded the retry limit. If the retry limit has been exceeded, then the device is marked as out of coverage and the transmission is complete. If the retry limit has not been exceeded, the retry count is incremented, the wait period is increased, the event notice message is resent via SMTP and the event notice send agent goes back to waiting for the time period to expire.

The remote notice system on a remote device is responsible for receiving event notice messages from the server, decrypting and decoding the messages, and performing the actions specified in the messages on the client device. The remote notice system may receive messages from SMS and/or IP sources. For SMS, the remote notice system receives messages from the SMS subsystem on the device. For IP, the remote notice system must establish and maintain the link to the server itself.

Upon startup, the remote notice system connects to the event notice registration agent on the server on a predetermined port. After successful connection, the device sends its device ID to the server in order to identify itself. After startup, the remote notice system waits for a message to arrive via SMS and/or IP or for a predetermined time period to expire. If the time period expires, the remote notice system checks the health of the IP connection. If the connection has been lost, the connection is reestablished with the server if possible. Then, if a good connection exists, the remote notice system resends its device ID to the server.

When a message arrives into the remote notice system, it will be decrypted with a key that has been previously agreed upon by the server and the remote device. The message is then removed from the transmission envelope and is checked to make sure it is a valid notification message. If the message is a valid notification message, the sequence number in the message is examined to see if it is a message that has already been processed. The remote notice system may receive multiple messages with the same sequence number if the remote device has been out of coverage and if the server has retried the transmission. Once the remote notice system has determined that it has a unique valid notification message, then it determines the proper client system to invoke in order to carry out the instructions contained within the notification message.

Referring now to the drawings, in which like numerals illustrate like elements throughout the several views, FIG. 1 is a block diagram illustrating an example of a remote notification system 10 environment including computer systems (11 and 21) and the remote devices (15, 17, 18 and 23) that utilize the notice system 100 of the present invention.

Each remote device has applications and can have a local data store 16. Computer servers 11 and 21 contain applications and server 11 further contains a server database 12 that is accessed by client systems 15, 17, 18 and 23 via intermittent connections 14(A-D), respectively, over network 13. The server 11 runs administrative software for a computer network and controls access to part or all of the network and its devices. The client systems 15, 17, 18 and 23 share the server data stored on the database 12 and may access the server 11 over a network 13, such as but not limited to: the Internet, a local area network (LAN), a wide area network (WAN), via a telephone line using a modem or other like networks. The server 11 may also be connected to the local area network (LAN) within an organization.

The structure and operation of the remote notification system 10 enables the server 11 and the database 12 associated therewith to handle clients more efficiently than previously known systems. Particularly, the remote notification system of the present invention provides a manner of providing notification of availability of data for downloading to the remote device. When the clients systems 15, 17, 18 and 23 (FIG. 1) connect to the server 11, the identity and IP address information associated with the remote device are transmitted to the server to be used for delivering data to the remote device.

The client systems 15, 17, 18 and 23 may each be located at remote sites. Client systems 15, 17, 18 and 23 include but are not limited to, PCs, workstations, laptops, PDAs, pagers, WAP devices, non-WAP devices, cell phones, palm devices and the like. Thus, when a user at one of the remote client systems 15, 17, 18 and 23 desires to be updated with the current information from the data at the server 11, the client system 15, 17, 18 and 23 communicates over the network 13, such as but not limited to WAN, internet, or telephone lines to access the server 11.

Advantageously, the present invention provides a system and method for notifying a remote device that there is data ready for transfer from server 11. First, a remote device 15 registers with server 11 to tell them at that a remote device is ready to receive data. Periodically, the server 11 determines if new data is available for a remote device 15. When a remote device 15 connects to the server 11, the remote device 15 downloads that data from the remote server 11.

Third party vendors' computer systems 21 and databases 22 can be accessed by the remote notification system server 11 in order to obtain information for dissemination to the remote devices. Data that is obtained from third party vendors computer system 22 and database 23 can be stored on the server 11 in order to provide later access to the user remote devices 15, 17, 18 and 21. It is also contemplated that for certain types of data that the remote user devices 15, 17, 18 and 23 can access the third party vendors data directly using the network 13.

Figure 2A:
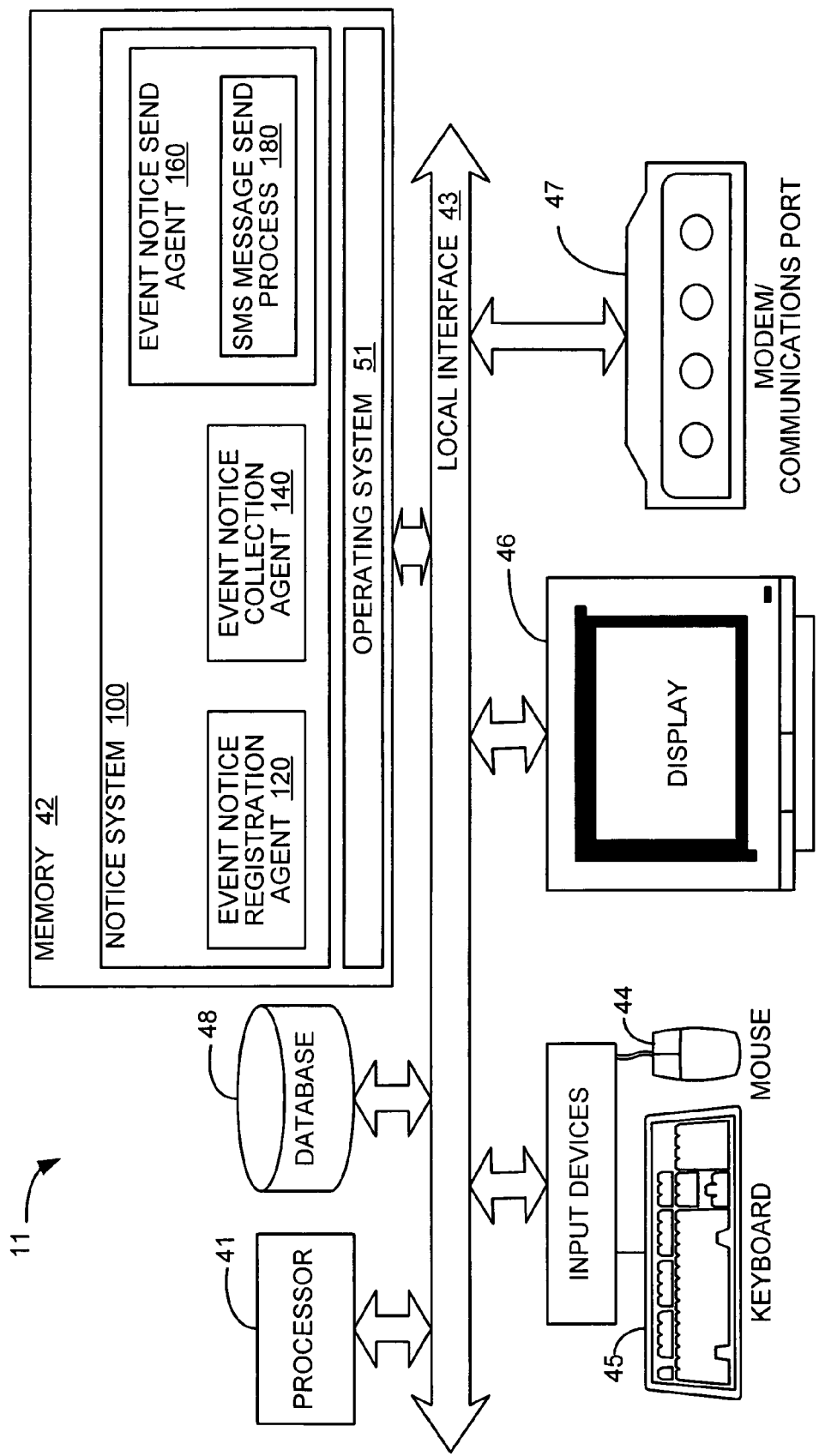
FIG. 2A is a block diagram illustrating an example of a server utilizing the notification system of the present invention, as shown in FIG. 1.
Figure 2B:
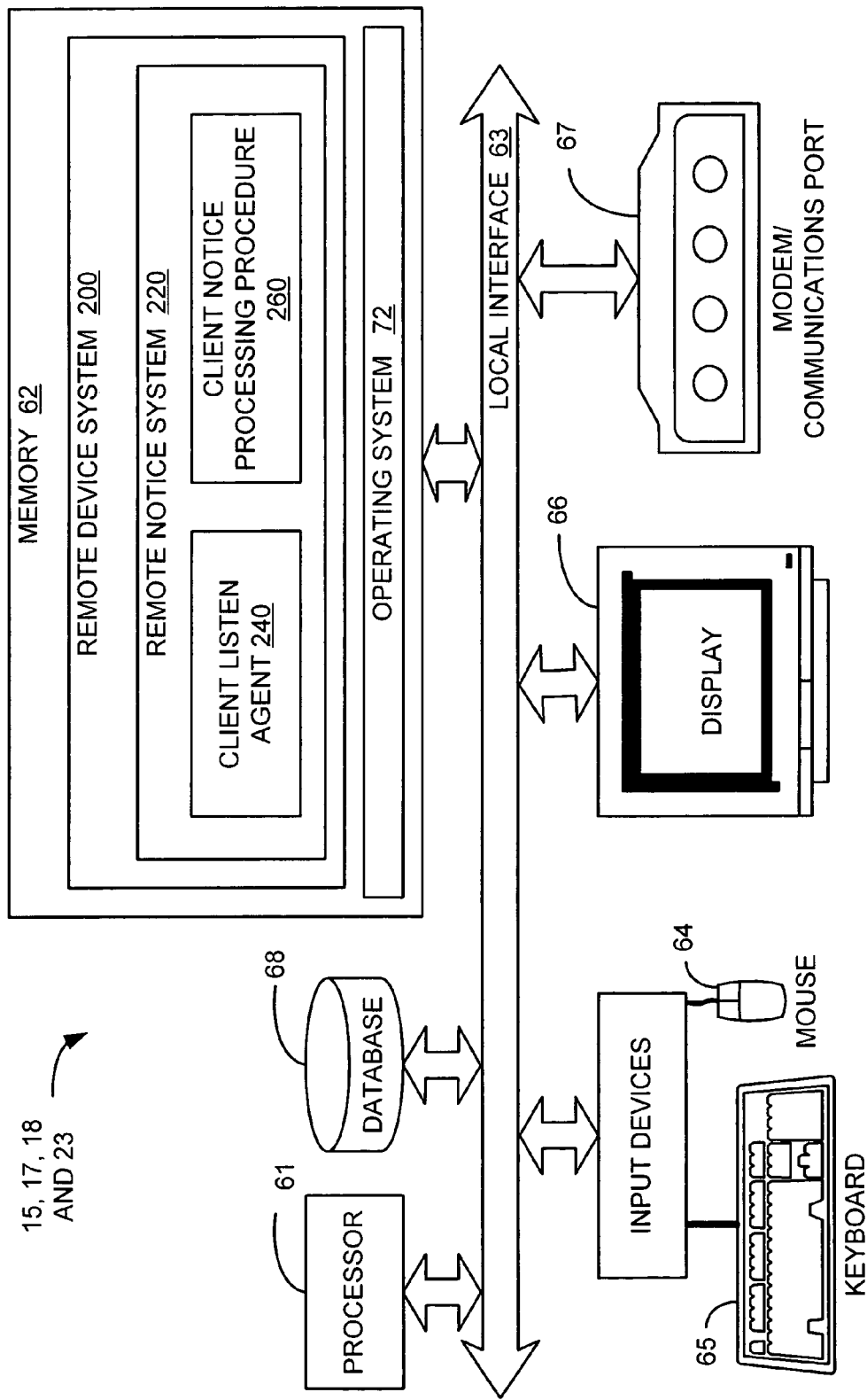
FIG. 2B is a block diagram illustrating an example of a remote device utilizing the notification system of the present invention, as shown in FIG. 1.

Illustrated in FIG. 2A is a block diagram demonstrating an example of a server 11, as shown in FIG. 1, utilizing the notice system 100 of the present invention. Illustrated in FIG. 2B is an example demonstrating a remote device utilizing the remote portion of the remote notice system 220 of the present invention. Remote devices 15, 17, 18 and 23 include, but are not limited to, PCs, workstations, laptops, PDAs, pagers, WAP devices, non-WAP devices, cell phones, palm devices and the like. The components of the remote device 15, 17, 18 and 23 are substantially similar to that of the description for the server 11 (FIG. 2A). However, it is contemplated that many of the components in the user's remote device 15, 17, 18 and 23 can be more limited in general function.

Generally, in terms of hardware architecture, as shown in FIG. 2A, the computer devices 11 and 21 herein includes a processor 41, memory 42, and one or more input and/or output (I/O) devices (or peripherals), such as data base or storage 48, that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU) or an auxiliary processor among several processors associated with the computer 11 and 21, and a semiconductor based microprocessor (in the form of a microchip) or a macroprocessor. Examples of some suitable commercially available microprocessors include, but are not limited to: an 80×86, Pentium, Celeron, Xeon or Itanium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., read only memory (ROM), erasable programmable read only memory (EPROM), electronically erasable programmable read only memory (EEPROM), programmable read only memory (PROM), tape, compact disc (CD-ROM), DVD read on memory, magnetic disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but still can be accessed by processor 41.

The software in memory 42 may include one or more separate programs, each of which comprises an ordered listing of executable instructions for implementing logical functions. In the example illustrated in FIG. 2A, the software in the memory 42 includes, but is not limited to, a suitable operating system (O/S) 51 and the notice system 100 of the present invention. The notice system 100 further includes the event notice registration agent 120, event notice collection agent 140, event notice sent agent 160. The event notice sent agent 160 further includes the SMS message send process 180. The software components will be described in further detail with regard to FIG. 3 through FIG. 6B.

A nonexhaustive list of examples of suitable commercially available operating systems 51 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., Palm OS available from Palm Computing, Inc., and Windows Mobile available from Microsoft Corporation).

The operating system 51 essentially controls the execution of other computer programs, such as the remote device synchronization activities process 100, and provides scheduling, input-output control, file and data management, memory management, and communication control and related services. However, it is contemplated by the inventors that the notice system 100 of the present invention is applicable on all other commercially available operating systems.

The notice system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 51. Furthermore, the notice system 100 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, ADA and the like.

The I/O devices may include input devices, for example but not limited to, a keyboard 45, mouse 44, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing other files, devices, systems, or a network), a radio frequency (RF) or other transceiver (not shown), a telephonic interface (not shown), a bridge (not shown), a router (not shown), etc.

If the computers 11 and 21 are a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM EEPROM or the like, so that the BIOS can be executed when the computer is activated.

When the computers 11 and 21 are in operation, the processor 41 is configured to execute software stored within the memory 42, to communicate data to and from the memory 42, and to generally control operations of the computer pursuant to the software. The notice system 100 and the O/S 51 are read, in whole or in part, by the processor 41, perhaps buffered within the processor 41, and then executed.

When the notice system 100 is implemented in software, as is shown in FIGS. 2A and 2B, it should be noted that the notice system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The notice system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the notice system 100 is implemented in hardware, the notice system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Illustrated in FIG. 2B is a block diagram demonstrating an example of a remote device 15, 17, 18 and 23 utilizing the remote notice system 220 of the present invention, as shown in FIG. 1. As illustrated, the remote device 15, 17, 18 and 23 includes many of the same components as server 11 described with regard to FIG. 2A. Hereinafter, the remote device is device 15, 17, 18 and 23 will be referred to as remote device 15 for the sake of brevity.

Located in memory 62 is the remote device system 200, which includes, but is not limited to, the remote notice system 220. Located in memory 62 is the remote device system 200, which includes, but is not limited to, the remote notice system 220. The remote notice system 220 further includes the client listened agent 240 and client notice processing procedure 260. The remote notice system 220 and sub-components client listened agent 240 and client notice processing procedure 260 are herein defined in further detail with regard to FIG. 7 through FIG. 8C. When the remote notice system 220 is implemented in software, as is shown in FIG. 2B, it can be stored on virtually any computer readable medium for use by or in connection with any computer related system or method.

In an alternative embodiment, where the remote device system 200 is implemented in hardware, the remote notice system 220 can be implemented in the same way as described above with regard to the notice system 100 (FIG. 2A). In the example illustrated, it is the remote notice system 220 that interacts with the notice system 100 of the present invention.

Figure 3:
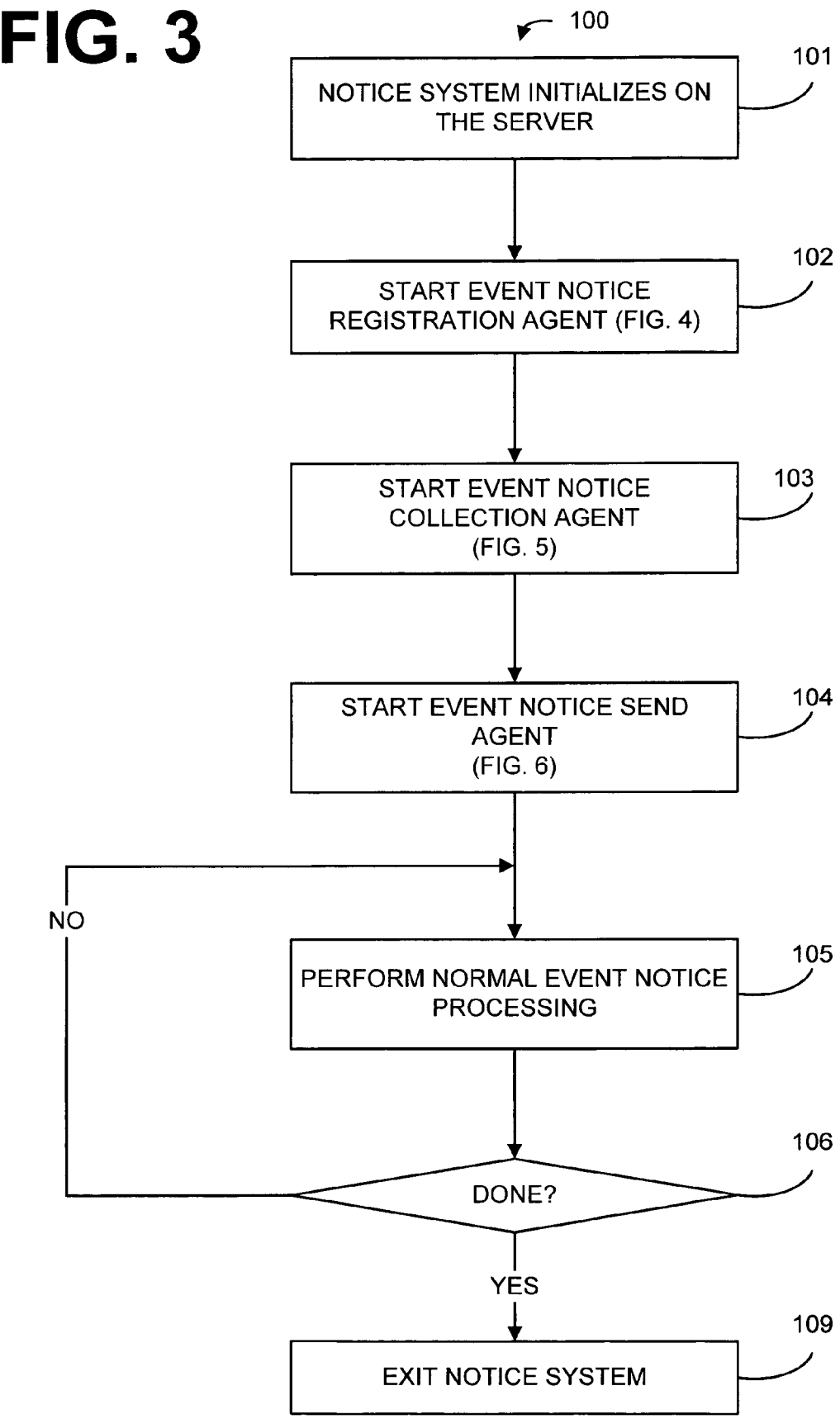
FIG. 3 is a flow chart illustrating an example of the operation of the notification system of the present invention on the server, as shown in FIGS. 1 and 2A.

Illustrated in FIG. 3 is a flow chart describing an example of the operation of the notice system 100 of the present invention on a server 11, as shown in FIGS. 1 and 2A. The notice system 100 enables a user to obtain the notice of the availability of data on server 11 to be transferred to the remote device 15, 17, 18, and 23. The notice system 100 on server 11 comprises 3 sub-components: the event notice registration agent, the event notice collection agent, and the event notice send agent 160. After the notice system 100 is initialized, each of these sub-components is initialized and run in the background. Each of these sub-components processes events relevant to their own responsibility until the notice system 100 is shut down.

First at step 101, the notice system 100 is initialized. This initialization includes the startup routines and processes embedded in the BIOS of the server 11. The initialization also includes the establishment of data values for particular data structures utilized in the server 11 and notice system 100. At step 102, the notice system 100 starts the execution of the event notice registration agent. The event notice registration agent is herein defined in further detail with regard to FIG. 4. The event notice registration agent collects registration events from the server 11 and maintains the list of the remote device clients that are available to receive notifications on server 11.

At step 103, the notice system 100 starts the execution of the event notice collection agent. The event notice collection agent is herein defined in further detail with regard to FIG. 5. The event notice collection agent collects notifications and accused them for later delivery to the remote devices 15.

At step 104, the notice system 100 starts the execution of the event notice send agent. The event notice send agent is herein defined in further detail with regard to FIG. 6. The event notice send agent collects notification events from a variety of sources and cues of them for transmission to the client on the remote device.

At step 105, the notice system 100 performs the normal event notice processing. This normal event notice processing includes the collection and sending of notice information. At step 106, the notice system 100 determines if continued operation is to be performed. If it is determined at step 106 that continued operation is to be performed, many notice system 100 returns to repeat steps 105 and 106. However, if it is determined at step 106 that normal event processing is not to occur, then the notice system 100 exits at step 109.

Figure 4:
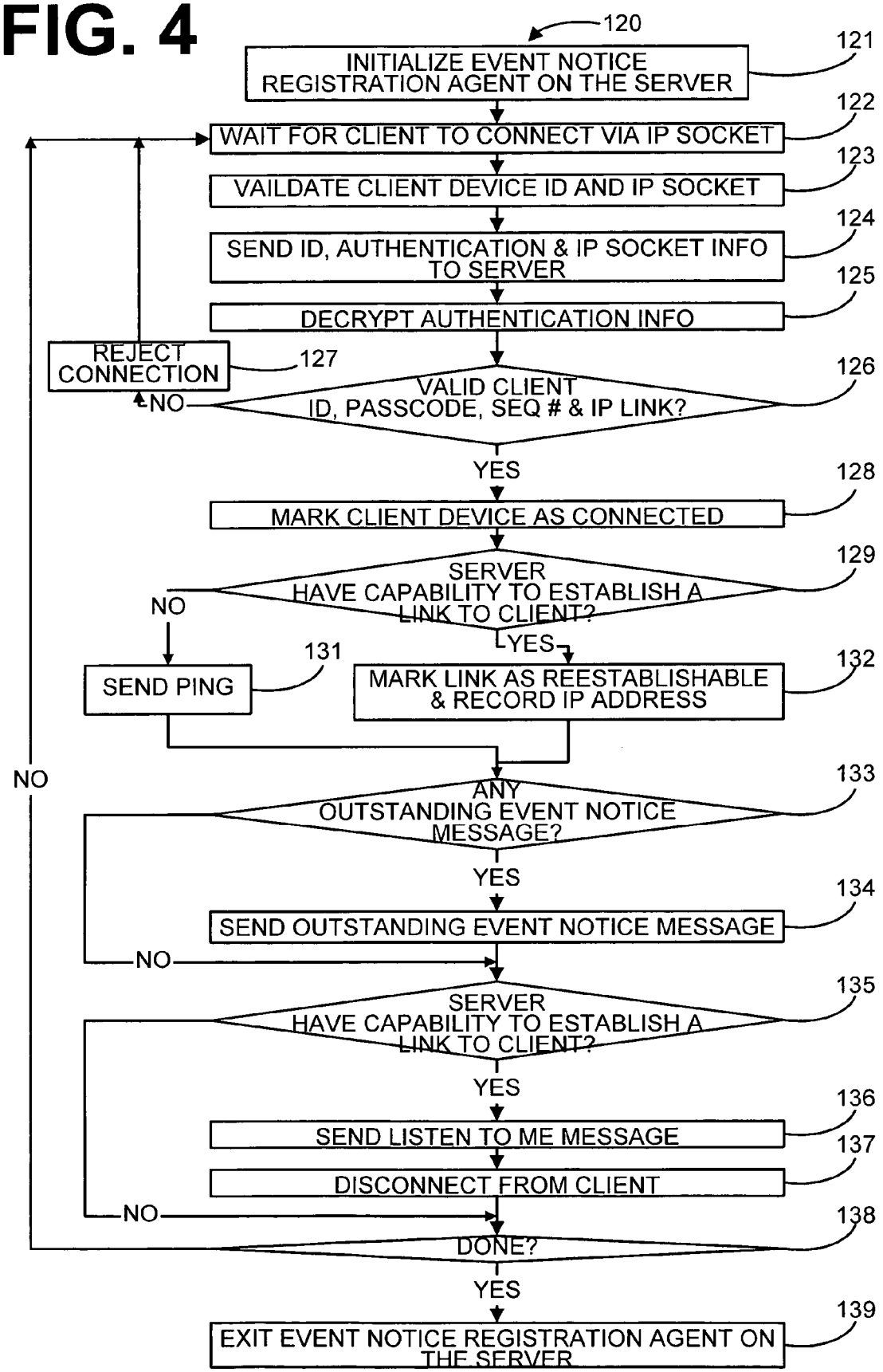
FIG. 4 is a flow chart illustrating an example of the operation of the event notice registration agent utilized by the notification system of the present invention, as shown in FIGS. 1-3.

Illustrated in FIG. 4 is a flow chart describing an example of the operation of the event notice registration agent 120 on a server 11 utilized in the notice system 100 of the present invention, as shown in FIGS. 1-3. The event notice registration agent 120 collects registration events from clients and maintains a list of clients that are available to receive IP notifications. The event notice registration agent 120, after initialization, listens on a configurable port for connections from clients. After it receives a client connection, it waits for a transmission from the client containing the client device ID.

If no errors occur on the link and the device ID matches a known device in the system, then the event notice registration agent 120 marks the device as connected and available to receive any IP notifications. Then, the event notice registration agent 120 checks to see if there are any outstanding notifications pending for this device ID. If there are outstanding notifications pending, the event notice registration agent 120 constructs and sends the pending notifications. If not, the event notice registration agent 120 proceeds to the next check. The last check determines if notice system 100 on server 11 is able to reestablish a link to the remote notice system 220 on remote device 15. If server 11 has the capability to re-establish a link with the remote device 15 and the server 11 sends a listen to me message and disconnects from the remote device 15. This is done in order to save bandwidth if the remote device is directly addressable. If it is determined that the server 11 cannot reestablish a link with the remote device 15, then the connection to the remote between the remote device 15 and server 11 is maintained.

First at step 121, the event notice registration agent 120 is initialized. This initialization includes the startup routines and processes embedded in the BIOS of the server 11. The initialization also includes the establishment of data values for particular data structures utilized in the event notice registration agent 120.

At step 122, the event notice registration agent 120 waits for a client on a remote device 15 to connect via an internet protocol (IP) socket. After a client connects, the event notice registration agent 120 validates the client using the remote device ID and IP socket information. After validating the device ID and IP socket, the event notice registration agent 120 sends the ID, authentication and IP socket information to the server 11 for registration. At step 125, the event notice registration agent 120 decrypts the authentication information. In preferred embodiment, the authentication information contains anything to the more in the predefined key to match the key utilized in the decryption and sequence number to uniquely identify each message receive. The sequence number is used to prevent registration messages being replayed by a malicious individual or reprocessing previously processed registration messages.

At step 126, the event notice registration agent 120 then attempts to validate the client information. The client information includes at least one of the following, but is not limited to, the client device ID, passcode, sequence number and IP link. If it is determined at step 126 that any of the client information checked is invalid, the event notice registration agent 120 rejects the connection at step 127 and returns to wait for the next client to connect at step 122. However, if it is determined at step 126 that the client information checked is valid, then the client on remote device 15 is identified as connected, at step 128, and that information is also sent to server 11.

At step 129, it is determined if server 11 has the capability to reestablish a link to the client on the remote device 15 currently being registered. If it is determined that the server 11 is not capable of reestablishing a link to the client on the remote device 15 that is currently being registered, the event notice registration agent 120, at step 131, sends a ping (i.e. a ping message is merely message to verify the remote device 15 is still connected) then skips step 133. However, if it is determined that server 11 does have the capability to reestablish a link to the client on remote device 15 that is currently being registered, the event notice registration agent 120 marks the link as able to be reestablished and records the IP address at step 132.

At step 133, the event notice registration agent 120 determines if there are any outstanding event notices messages to be sent to the client on the remote device 15 currently being registered. If there are no outstanding event notice messages to be sent, the event notice registration agent 120 skips to step 135. However, if it is determined at step 133 that there is an outstanding event notice message, then the outstanding event notice messages is sent at step 134.

At step 135, it is again determined if server 11 has the capability to reestablish a link to the client on the remote device 15 currently being registered. If it is determined that the server 11 is not capable of reestablishing a link to the client on the remote device that is currently being registered, the event notice registration agent 120 skips to step 138. However, if it is determined that server 11 does have the capability to reestablish a link to the client on remote device 15 that is currently being registered, the event notice registration agent 120 sends a listen to me (LTM) message to the client on the remote device 15 currently being registered at step 136. A LTM message instructs the remote device 15 to drop the current connection with server 11, because server 11 can initiate contact when needed with the remote device 15. At step 137, the connection link to the client on the remote device 15 being registered is dropped.

At step 138, the event notice registration agent 120 determines if there are more event notice registrations to be performed. If it is determined at step 138 that there are more event notice registrations to be processed, the event notice registration agent 120 returns to repeat steps 122 through 138. However, if it is determined that there are no more registrations to be processed, then the event notice registration agent 120 exits at step 139.

In an alternative embodiment, the event notice registration agent 120 will maintain a connection to the client on the remote device 15 until the client terminates the notification or the remote device dropped the connection.

And still another alternative embodiment, the event notice registration agent 120 will address the client on remote device 15 after that link is dropped. If a connection to the client can not be established, the server 11 will mark the remote device as out of coverage and unconnected.

Figure 5:
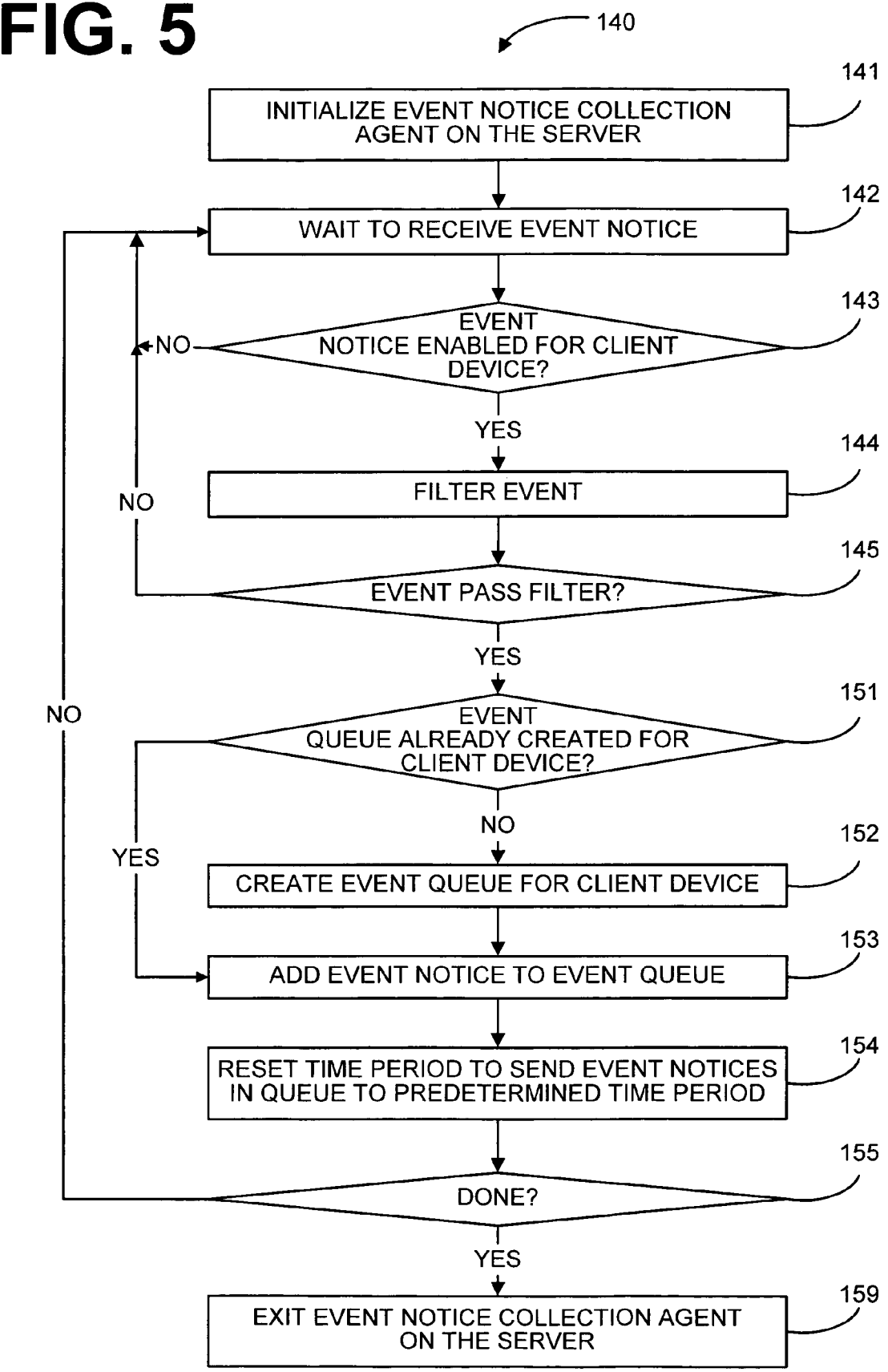
FIG. 5 is a flow chart illustrating an example of the operation of the event notice collection agent utilized by the notification system of the present invention, as shown in FIGS. 2A-3.

Illustrated in FIG. 5 is a flow chart describing an example of the operation of the event notice collection agent 140 utilized by the notice system 100 of the present invention, as shown in FIGS. 2A-3. The event notice collection agent 140 collects notification events from various sources, passes them through filters, aggregates and queues them for transmission. If the remote device 15 associated with the event is configured to receive notifications, the event is passed through each of several possible filters that serve to limit the events that actually produce notifications. Once an event passes the filters, the event notice collection agent will queue the events. If a queue does not exist for the client device that is the target of the notification event, the event notice collection agent 140 will create one. An event notification is then constructed and added to the queue and the queue timeout will be initialized to the predetermined setting. When this timeout expires, it will be time to send any notifications that have accumulated in the queue. This timeout period can be a preset tine period from the last data transmission or can be manipulated with a technique known as throttling. The throttling time period is determined from a certain time period after the last data transmission to the client device and any additional time periods defined by a system administrator in order to minimize bandwidth utilization.

First, the event notice collection agent 140 is initialized on the server 11 at step 141, and performs similar functions as the initialization of the notice system 100 as described above. The initialization also includes the establishment of data values for particular data structures utilized in the event notice collection agent 140. At step 142, the event notice collection agent 140 waits to receive an event notice from server 11.

At step 143, the event notice collection agent 140 of the present invention determines if the event notice received is enabled for the client on the intended remote device 15. If it is determined at step 143 that the intended remote device 15 is not enabled to receive an event notice, then the event notice collection agent 140 returns to wait for the next event notice at step 142. However, if it is determined at step 143 that the client on the intended remote device 15 is enabled to receive the event notice, the event notice collection agent 140 filters the event notice received at step 144.

At step 145, it is determined its the received event notice passed the event notice filter. If the event notice did not pass through the event filter at step 144, then the event notice collection agent 140 returns to step 142, and waits to receive the next event notice. However, if it is determined at step 145 that the event notice received did pass the event filter at step 144, the event notice collection agent 140 determines if an event queue is already created for the client on the intended remote device 15 at step 151.

If it is determined at step 151 that an event queue is already created for the client on the intended remote device 15, the event notice collection agent 140 skips the step 153. However, if it is determined at step 151 that there is no other queue for the current event notice, then the event notice collection agent 140 creates an event queue for the client on the intended remote device 15 at step 152.

At step 153, the event notice collection agent 140 then adds the event notice to the event queue for the intended client on the remote device 15. At step 154, the event notice collection agent 140 resets the time period to send event notices in the queue to a predetermined time period.

At step 155, the event notice collection agent 140 determines if there are more event notices to be processed. If it is determined at step 155 that there are more event notices to be processed, then the event notice collection agent 140 returns to repeat steps 142 through 155. However, if it is determined at step 155 that there are no more event notices to be processed, then the event notice collection agent 140 exits at step 159.

Illustrated in FIG. 6A is a flow chart describing an example of the operation of the event notice send agent 160 utilized by the notice system 100 of the present invention, as shown in FIGS. 2A-3. The event notice send agent 160 is responsible for detecting notification queues that are ready for transmission, creating notification messages from these events that will be transmitted, picking the best method of transmission, and performing the message transmission.

The event notice send agent 160 monitors event notification queues looking for those whose timeouts have expired. Once a queue is found that has timed out and is thus ready for transmission, the event notice send agent 160 will construct an event notice message for the intended client on the remote device 15. In the preferred embodiment, this message is encrypted with a remote device specific key that has previously been determined. The device specific keys can be determined number of different ways. In the preferred embodiment, the device specific key is established during synchronization of the remote device 15 with server 11. An example of the synchronization of information on a remote device 15 is described in U.S. patent application Ser. No. 10/037,626, filed on Jan. 3, 2002, entitled "A SYSTEM IN METHOD FOR DATA SYNCHRONIZATION BETWEEN REMOTE DEVICES" which is incorporated by reference herein in its entirety.

Once the message is constructed, the event notice send agent 160 will determine which method to use in order to transmit the message. If the event notice send agent 160 has registered the device as IP capable, the message will be sent over the IP link. Otherwise, the message will be sent via SMS over SMTP if the device is SMS capable.

First, at step 161, the event notice send agent 160 is initialized on the server 11 and performs similar functions as the initialization of the notice system 100 as described above. The initialization also includes the establishment of data values for particular data structures utilized in the event notice send agent 160. At step 162, the event notice send agent 160 waits for the predetermined time period of a queue to expire.

After a queue has expired at step 162, the event notice send agent 116 then creates an event notice message at step 163. In the preferred embodiment, this event notice message is encrypted with a predetermined encryption key at step 164. In the preferred embodiment, the predetermined encryption key is established during synchronization of the remote device 15 with server 11. However, an alternative embodiment, the event notice message can be sent unencrypted.

At step 165, it is determined if the intended client on remote device 15 is IP capable (i.e. registered). If it is determined at step 165 that the intended client is not IP capable, then the event notice send agent 166 skips to step 173. However, if it is determined at step 165 at the intended client on remote device 15 is IP capable, then the event notice send agent 160 determines if the IP link for the intended client on remote device 15 is able to be re-established at step 166. If it is determined at step 166 to the IP link is not able to be re-established, then the event notice send agent 160 skips to step 171. However, it is determined that the IP link of the intended client on remote device 15 is able to be re-established, the event notice send agent 160 then establishes a link with the intended client on remote device 15 using the IP address acquired during event registration by the event notice registration agent 120 (FIG. 4).

At step 171, the event notice message is sent to the IP address or socket information acquired during event registration. At step 172, the event notice send agent 160 determines if the event notice message was received by the intended client on remote device 15. If it is determined that the event notice message had been received by the intended client, then the event notice send agent 163 returns to wait for the next queue to expire at step 162. However, if it is determined at step 172 that the event notice message had not been received by the intended client on remote device 15, then the event notice send agent 160 determines if the client on remote device 15 is SMS capable at step 173.

If it is determined at step 173 that the client on the remote device the team is not SMS capable, then the event notice send agent 160 queues the event notice message at step 174 and then returns to wait for the next queue to expire at step 162. However, if it is determined at step 173 that the intended client on remote device 15 is SMS capable, then the event notice send agent 160 performs the SMS message send process at step 175. The SMS message send processes is herein defined in further detail with regard to FIG. 6B.

At step 176, the event notice send agent 160 determines if there are more event notice queues to be processed. If it is determined at step 176 that there are more event notice queues to be processed, then the event notice send agent 160 returns to repeat steps 162 through 176. However, if it is determined at step 176 that there are no more event notice queues to be processed, then the event notice send agent 160 exits at step 179.

Figure 6B:
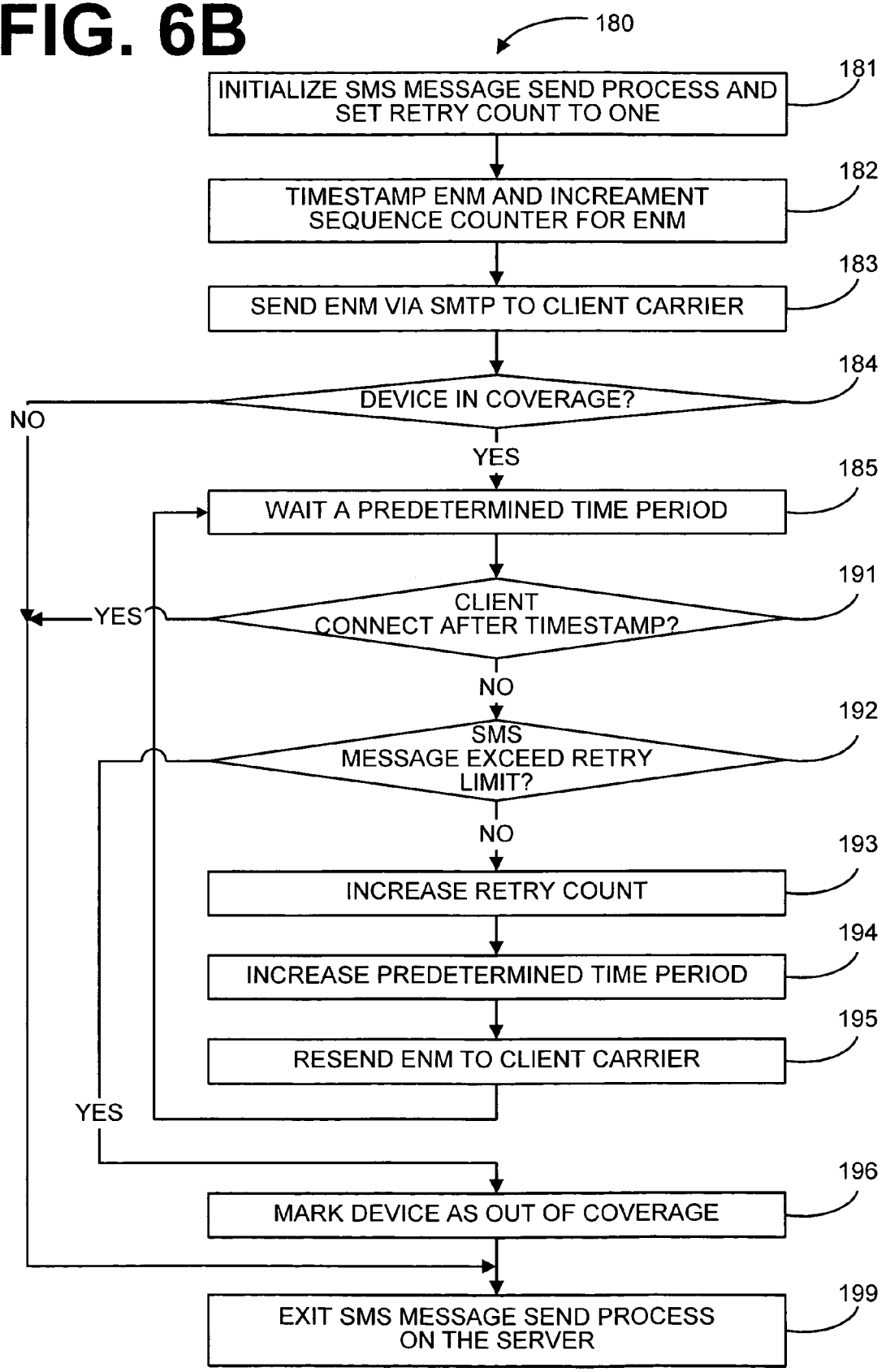
FIG. 6B is a flow chart illustrating an example of the operation of the SMS message send process utilized by the event notice send agent in the notification system of the present invention, as shown in FIGS. 2A and 6A.

Illustrated in FIG. 6B is a flow chart describing an example of the operation of the SMS message send process 180 utilized by the event notice send agent 160 in the notice system 100 of the present invention, as shown in FIGS. 2A and 6A. The SMS message send process 180 starts an SMS transmission by initializing the retry count for the current notice message to one, time stamping the notice message with the current time, and setting the sequence number for the message to the next increment. The sequence number is to uniquely identify the event notice message and order of the event notice messages. The sequence number can also indicate when event notice messages are inadvertently missed.

The message is then sent to the carrier for the intended remote device 15, where it is converted into an SMS transmission to the intended remote device 15. If the intended remote device 15 is not in coverage, the transmission is complete and retries will not be attempted. However, if the intended remote device 15 is in coverage, the event notice send agent waits for a predetermined configurable time period.

After this time period expires, the SMS message send process 180 checks to see if the client device has connected to the server at a time after the time stamp in the notice message. If so, the transmission is assumed to have been acknowledged and the transmission is complete. If not, the SMS message send process 180 checks to see if the number of retries has exceeded the retry limit. If the retry limit has been exceeded, then the device is marked as out of coverage and the transmission is complete. If the retry limit has not been exceeded, the retry count is incremented, the wait period is increased, the event notice message is resent and the SMS message and the send process 180 goes back to waiting for the time period to expire.

First, at step 181, the SMS message send process 180 is initialized on the server 11 and performs similar functions as the initialization of the notice system 100 as described above. The initialization also includes the establishment of data values for particular data structures utilized in the SMS message send process 180. The initialization also includes setting a retry count. In the preferred embodiment the retry count is set to allow 3 to 5 retries, however it is understood that any number may be utilized for a retry count. At step 182, the SMS message send process 180 time stamps the event notice message and increments the sequence counter for the event notice message. The sequence counter is to uniquely identify the event notice message and order of the event notice messages. The sequence counter can also indicate when event notice messages are inadvertently missed.

At step 183, the SMS message send process 180 on server 11 sends the event notice message via SMTP to the intended client's carrier. At step 184, the SMS message send process 180 determines if the intended remote device 15 is in coverage at step 184. If it is determined at step 184 that the intended remote device 15 is not in coverage, then the SMS message send process 180 exits at step 199. However, if it is determined at step 184 that the intended remote device 15 is in coverage, then the SMS message send process 180 waits a predetermined time period at step 185. In the preferred embodiment, the predetermined time period is configured in the system software. In an alternative embodiment, this predetermined time period can be set by a system administrator.

At step 191, it is determined if the client on the intended remote device 15 connects after the time stamp. If it is determined at step 191 that the intended client on remote device 15 connect after the time stamp, the SMS message send process 180 proceeds to step 199. However, if it is determined at step 191 that the intended client on remote device 15 did not connects after the time stamp, it is then further determined if the SMS message count exceeds the SMS message retry limit at step 192. If it is determined that the SMS message retry limit is exceeded, then the SMS message send process 180 skips to step 196. However, if it is determined at step 192 that the retry limit is not exceeded, then the SMS message send process 180 increases the retry count at step 193. At step 194 the SMS message send process 180 increases the predetermined wait time period. In the preferred embodiment, the predetermined wait time period is increased as the retry count goes up. In alternative embodiments, this wait time period could remain constant, increase gradually, or increase exponentially.

At step 195, the event notice message is resent to the client carrier, and then returns to wait the predetermined time period at step 185. At step 196, the SMS message send process 180 marks the remote device 15 as out of coverage and at step 199 the SMS message send process then exits.

Figure 7:
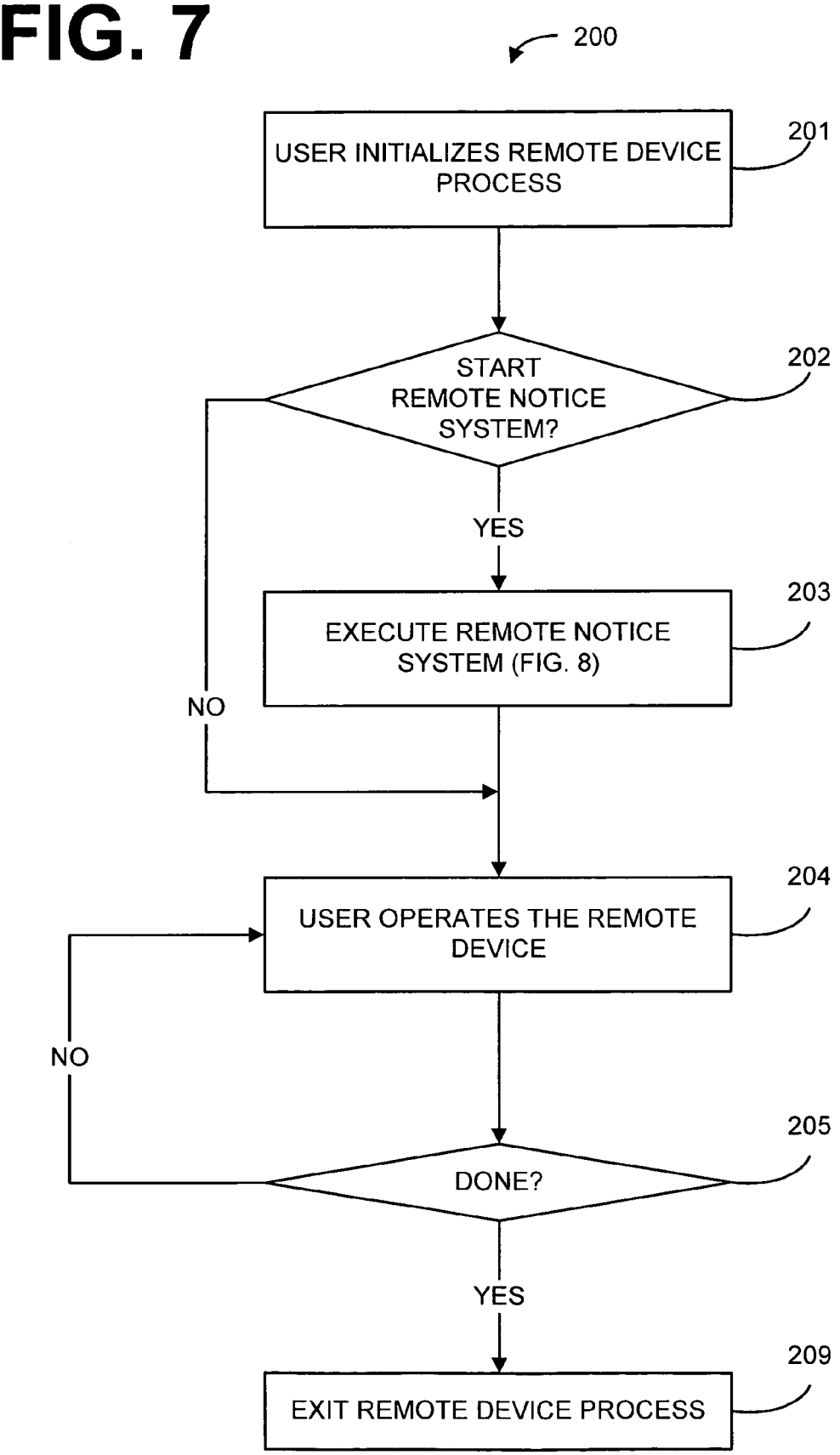
FIG. 7 is a flow chart illustrating an example of the process flow of the remote device that utilizes notification system of the present invention, as shown in FIGS. 1-6B.

Illustrated in FIG. 7 is a flow chart describing an example of the remote device process 200 on the remote device 15 that utilizes the remote notice system 220 of the present invention, as shown in FIGS. 1 and 2B.

First at step 201, the remote device 15 is initialized. This initialization includes the startup routines and process embedded in the BIOS of the remote device 15. The initialization also includes the establishment of data values for particular data structures utilized in the remote device 15. At step 202, the remote device process 200 determines if the remote notice system 200 is to be started. If it is determined at step 202 to that the remote notice system is not to be initiated, then the remote device process 200 proceeds to step 204. However, if it is determined at step 202 that the remote notice system is to be initiated, the remote notice system is then executed at step 203.

At step 204, the user operates the remote device 15 in a normal operating mode. The normal operating mode of remote device 15 will vary depending upon the type of the device.

Periodically, the remote device 15 determines if the user desires to continue normal operation of the remote device 15. If it is determined that the user wishes to continue normal operation of the remote device 15, the remote device process 200 then returns to repeat steps 204 and 205. However, if it is determined at step 205 that the user wishes to terminate operation of the remote device 15, then the remote device process 200 then exits at step 209.

Illustrated in FIG. 8A is a flow chart demonstrating an example of the remote notice system 220 on the remote device 15 that is utilized in the notice system 100 of the present invention, as shown in FIGS. 1-7. The remote notice system 220 is responsible for receiving event notice messages from the notice system 100 on server 11, decrypting and decoding the messages, and performing the actions specified in the messages on the client remote device 15. The remote notice system 220 may receive messages from SMS or IP sources. For SMS, the client receives messages from the SMS subsystem on the device.

For IP, the client remote device 15 must establish and maintain the link to the server 11. Upon startup, the remote notice system 220 connects to the event notice registration agent 120 on the server 11. In the preferred embodiment this connection occurs on a predetermined port. However, it is understood that other types of connections may be utilized.

After successful connection, the remote device 15 sends its device ID and authentication information to the server 11 in order to identify itself.

After startup, the remote notice system 220 waits for a message to arrive via SMS or IP or for a predetermined time period to expire. If the time period expires, the client remote device 15 checks the health of the IP connection. If the connection has been lost, the connection is reestablished with the server 11 if possible. Then, if a good connection exists, the remote device 15 resends its device ID to the server 11.

When a message arrives into the remote notice system 220, it will be decrypted with the key that was previously agreed upon by the server 11 and the client remote device 15. The message is then removed from the transmission envelope and is checked to make sure it is a valid notification message. If the message is a valid notification message, the sequence number in the message is examined to see if it is a message that has already been processed. The client remote device 15 may receive multiple messages with the same sequence number if the client remote device 15 has been out of coverage and if the server 11 has retried the transmission. Once the remote notice system 220 has determined that it has a unique valid notification message, then it determines the proper remote device system to invoke in order to carry out the instructions contained within the notification message.

First, the remote notice system 220 is initialized at step 221, and performs similar functions as the initialization of the remote device process 200 as described above. The initialization also includes the establishment of data values for particular data structures utilized in the remote notice system 220. Next, the remote notice system 220 connects to the server 11 at step 222. At step 223, the device ID and IP address are sent to server 11. At step 224, remote notice system 220 waits to receive the message from server 11 or for a predetermined time period to expire. At step 225 the remote notice system 220 determines if the predetermined time period has expired. If it is determined that the predetermined time period has not expired, then the remote notice system 220 proceeds to step 231. However, if it is determined that the predetermined time period has expired at step 225, then the remote notice system 220 determines if the connection to the IP server has failed at step 226. If it is determined that the connection to IP server 11 has failed then the remote notice system 220 returns to connect to IP server 11 at step 222. However, it is determined that the connection to IP server 11 has not failed, the remote notice system 220 then returns to wait for a message from the server or a reset predetermined time period to expire at step 224.

At step 231, the remote notice system 220 then determines if the message received from IP server 11 is a ping message. As known in the art, a ping message is merely message to verify the remote device 15 is still connected. If it is determined at step 231 that a ping message was not received, then the remote notice system 220 proceeds to step 233. However, if it is determined at step 231 that a ping message was received, then the remote notice system 220 resets the predetermined time period to a new predetermined time period step 232. In the preferred embodiment, the new predetermined time period is transmitted in the body of the ping message. In alternative embodiments, the new predetermined time period can be established by a system administrator during startup, an initial registration or data synchronization of the remote device, as this previously described. After resetting the new predetermined time period, the remote notice system 220 returns to wait for a message or the new predetermined time period to expire at step 224.

At step 233, the remote notice system 220 determines that the message received from server 11 was a listen to me message (LTM). If it is determined that the message from server 11 was not a LTM message, then the remote notice system 220 proceeds to step 235. However, if it is determined that the message from server 11 was a LTM message, the remote notice system 220 performs client listen agent at step 234. The client listen agent is herein defined in further detail with regard FIG. 8B. A LTM message instructs the remote device 15 to drop the current connection with server 11, because server 11 can initiate contact when needed with the remote device 15. This capability is more dependent upon the type of remote device 15 and the network, then it is server 11. This ability to connect when the server 11 has an event notice message to deliver will save on total connection time, bandwidth and power consumption of the remote device 15. The ability to connect only when there is data traffic can greatly reduce the cost of operating the notice system of the present intention on remote device 15.

At step 235, the remote notice system 220 performs the client notice processing procedure. The client notice processing procedure is herein defined in further detail with regard FIG. 8C. The client listen agent will decrypt, deconstruct and process event notice message from server 11.

At step 236, the remote notice system 220 determines if there are more messages to be processed. If it is determined at step 236 that there are more messages to be processed and the remote notice system 220 then returns to repeat steps 222 through 236. However, it is determined at step 236 that there are no more messages to be processed on the remote device 15, then the remote notice system 220 exits at step 239.

Illustrated in FIG. 8B is a flow chart demonstrating an example of the operation of the client listen agent 240 utilized by the remote notice system 220 on the remote device 15 that is utilized in the notification system of the present invention, as shown in FIGS. 2B and 8A. The client listen agent 240 will enable the server 11 to reconnect the remote device 15 and waits to receive an event notice message from server 11.

First, the client listen agent 240 is initialized at step 241, and performs similar functions as the initialization of the remote device system 200 for the remote device 15 as described above. The initialization also includes the establishment of data values for particular data structures utilized in the client listen agent 240. Next, the client listen agent 240 on the remote device 15 drops the current connection to server 11 at step 242. After dropping the current connection, the client listen agent 240 then creates a socket listener at step 243. In preferred embodiment this socket listener is created on a predetermined port.

At step 244, the client listen agent 240 waits for either a message from the server 11 or for a predetermined time period to expire. After either receiving a message from the server or after the predetermined time period expires, the client listen agent 240 then determines the actual action that triggered it out of step 244. At step 245, the client listen agent determines if the reason for triggering the client listen agent 240 is that the predetermined time period has expired.

If it is determined at step 245 that the predetermined time period has expired, then the client listen agent 240 then exits at step 249. However, if it is determined to step 245 that the predetermined time period has not expired then the client listen agent performs the client notice processing procedure at step 246. The client notice processing procedure is herein defined in further detail with regard FIG. 8C.

Illustrated in FIG. 8C is a flow chart demonstrating an example of the operation of the client notice processing procedure 260 utilized by the remote notice system 220 on the remote device 200 that is utilized in the notification system of the present invention, as shown in FIGS. 2B, 8A and 8B. The client notice processing procedure 260 provides for the decrypting, deconstruction and processing of an event notice message sent by server 11 on the remote device 15.

First, the client notice processing procedure 260 is initialized at step 261, and performs similar functions as the initialization of the remote device system 200 for the remote device 15 as described above. The initialization also includes the establishment of data values for particular data structures utilized in the client notice processing procedure 260. Next, the client notice processing procedure 260 decrypts the event notice message using a predetermined key at step 262. In the preferred embodiment, this message is decrypted with a remote device specific key that has previously been determined. The device specific keys can be determined a number of different ways. In the preferred embodiment, the device specific key is established during synchronization of the remote device 15 with server 11. An alternative embodiment this key may be determined during remote device 15 start up by either a system administrator or the user. At step 263, the message is deconstructed after decryption. The deconstruction of the event notice message is merely a parsing of the message into usable contents by the remote device 15.

At step 264, the client notice processing procedure 260 determines if the message received is an event notice message. If it is determined at step 264 that the message processed is not an event notice message and the client notice processing procedure to 60 proceeds to step 269. However, if it is determined at step 264 that the message is an event notice message, the client notice processing procedure 260 then determines that the event notice message has already been received at step 265. This is possible when messages are received and are later retransmitted due to communication or processing error.

If it is determined at step 265 that the event notice message has previously been received, then the client notice processing procedure 260 skips to step 269. However, if it is determined at step 265 that the event notice message has not been previously received, then the client notice processing procedure 260 determines the proper system to process the event notice message at step 266. At step 267 the client notice processing procedure then performs the proper system to process the event notice message.

At step 269, the client notice processing procedure 260 terminates operation on the remote device 15.

Any process descriptions or blocks in flow charts should be understood as representing modules, segments, or portions of code which include one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A method comprising:
    sending a message to an internet protocol (IP) and short message service (SMS) capable remote device using a IP link;
    determining, via a processor, that the message sent by the IP link was not received by the remote device;
    waiting a predetermined time period via the processor; and
    resending the message automatically using a SMS transmission process via the processor,
    wherein resending comprises continuing to attempt to resend an SMS message up to a predetermined number of retries until the SMS message is successfully sent,
    wherein the waiting further comprises, for each subsequent attempt to resend, waiting a predetermined period of time prior to resending, the predetermined period of time being longer than a period waited prior to an immediately previous attempt to resend the SMS message.

2. The method of claim 1, wherein the message is a notice message.

3. The method of claim 1, wherein the message is encrypted.

4. A method comprising:
    acquiring a message to be transmitted to an interne protocol (IP) and short message service (SMS) capable remote device;
    sending a notification message indicating that an action is pending for the remote device using a IP link;
    determining that the message sent by the IP link was not received by the remote device;
    waiting a predetermined time period; and
    resending the message automatically using a SMS transmission process, via a processor, wherein resending comprises the processor controlling continuing to attempt to resend an SMS message up to a predetermined number of retries until the SMS message is successfully sent,
    wherein the waiting further comprises, for each subsequent attempt to resend, the processor controlling waiting a predetermined period of time prior to resending, the predetermined period of time being longer than a period waited prior to an immediately previous attempt to resend the SMS message.

5. An apparatus comprising a processor and a memory storing executable instructions that in response to execution by the processor cause the apparatus to at least perform the following:
    sending a message to an interne protocol (IP) and short message service (SMS) capable remote device using a IP link;
    determining that the message sent by the IP link was not received by the remote device;
    resending the message automatically using a SMS transmission process, wherein the SMS transmission process includes continuing to attempt to resend an SMS message up to a predetermined number of retries until the SMS message is successfully sent; and
    waiting a predetermined time period before resending the message using the SMS transmission process, wherein the instructions cause the apparatus to, for each subsequent attempt to resend, wait a predetermined period of time prior to resending, the predetermined period of time being longer than a period waited prior to an immediately previous attempt to resend the SMS message.

6. The apparatus of claim 5, wherein the message is a notice message.

7. The apparatus of claim 5, wherein the message is encrypted.

8. An apparatus comprising a processor and a memory storing executable instructions that in response to execution by the processor cause the apparatus to at least perform the following:
- acquire a message to be transmitted to an interne protocol (IP) and short message service (SMS) capable remote device;
- send a notification message indicating that an action is pending for the remote device using a IP link;
- determine that the message sent by the IP link was not received by the remote device;
- resend the message automatically using a SMS transmission process, wherein resending comprises continuing to attempt to resend an SMS message up to a predetermined number of retries until the SMS message is successfully sent; and
- wait a predetermined time period before resending the message using the SMS transmission process, wherein the instructions cause the apparatus to, for each subsequent attempt to resend, wait a predetermined period of time prior to resending, the predetermined period of time being longer than a period waited prior to an immediately previous attempt to resend the SMS message.

9. The apparatus of claim 8, wherein the message is encrypted.

10. A computer program product comprising at least one non-transitory physical electronic storage memory device for storing instructions that when executed by a processor provide notification to an interne protocol (IP) and short message service (SMS) capable remote device, comprising:
- instructions for sending a message to the remote device using a IP link;
- instructions for determining that the message sent by the IP link was not received by the remote device;
- instructions for resending the message automatically using a SMS transmission process, wherein resending comprises continuing to attempt to resend an SMS message up to a predetermined number of retries until the SMS message is successfully sent; and
- instructions for waiting a predetermined time period before resending the message using the SMS transmission process, wherein the instructions for waiting further provide, for each subsequent attempt to resend, waiting a predetermined period of time prior to resending, the predetermined period of time being longer than a period waited prior to an immediately previous attempt to resend the SMS message.

11. The computer program product of claim 10, wherein the message is a notice message.

12. The computer program product of claim 10, wherein the message is encrypted.

13. A computer program product comprising at least one non-transitory physical electronic storage memory device for storing instructions that when executed by a processor provide notification to an interne protocol (IP) and short message service (SMS) capable remote device, comprising:
- instructions for acquiring a message to be transmitted to the remote device;
- instructions for sending a notification message indicating that an action is pending for the remote device using a IP link;
- instructions for determining that the message sent by the IP link was not received by the remote device;
- instructions for resending the message automatically using a SMS transmission process, wherein resending comprises continuing to attempt to resend an SMS message up to a predetermined number of retries until the SMS message is successfully sent; and
- instructions for waiting a predetermined time period before resending the message using the SMS transmission process, wherein the instructions for waiting further provide, for each subsequent attempt to resend, waiting a predetermined period of time prior to resending, the predetermined period of time being longer than a period waited prior to an immediately previous attempt to resend the SMS message.

* * * * *

UNITED STATES PATENT AND TRADEMARK OFFICE
CERTIFICATE OF CORRECTION

PATENT NO. : 7,881,661 B2
APPLICATION NO. : 10/871873
DATED : February 1, 2011
INVENTOR(S) : Mohammadioun et al.

Page 1 of 1

It is certified that error appears in the above-identified patent and that said Letters Patent is hereby corrected as shown below:

Column 3,
Line 38, "from is anywhere" should read --from anywhere--.

Column 12,
Line 59, "preset tine period" should read --preset time period--.

Column 20,
Lines 24 and 49, "interne" should read --internet--.

Column 21,
Lines 7 and 32, "interne" should read --internet--.

Column 22,
Line 18, "interne" should read --internet--.

Signed and Sealed this
Twenty-fifth Day of September, 2012

David J. Kappos
*Director of the United States Patent and Trademark Office*